United States Patent [19]

Crozier et al.

[11] 3,857,808
[45] Dec. 31, 1974

[54] PROCESS FOR PREPARING HIGH SOLIDS CONTENT POLYMER LACQUER DISPERSIONS

[75] Inventors: William Andrew Crozier; Dieter Heinrich Klein, both of Midland, Mich.

[73] Assignee: The Dow Chemical Company, Midland, Mich.

[22] Filed: Apr. 24, 1972

[21] Appl. No.: 246,874

[52] U.S. Cl. .......... 260/33.6 UA, 260/34.2, 260/882
[51] Int. Cl. ..................... C08f 45/28, C08f 47/20
[58] Field of Search ...... 260/34.2, 29.1 R, 33.6 UA, 260/882

[56] References Cited
UNITED STATES PATENTS

| | | | |
|---|---|---|---|
| 3,075,388 | 6/1963 | Osmond et al. | 260/34.2 |
| 3,317,635 | 5/1967 | Osmond | 260/34.2 |
| 3,325,443 | 6/1967 | Christenson et al. | 260/41 R |
| 3,382,297 | 5/1968 | Thompson | 260/34.2 |
| 3,405,087 | 10/1968 | Fryd | 260/33.6 UA |
| 3,514,500 | 5/1970 | Osmond et al. | 260/34.2 |
| 3,607,821 | 9/1971 | Clarke et al. | 260/34.2 |
| 3,652,472 | 3/1972 | Clarke et al. | 260/34.2 |
| 3,716,506 | 2/1973 | Simms et al. | 260/882 |
| 3,746,673 | 7/1973 | Simms et al. | 260/33.6 UA |

*Primary Examiner*—Allan Lieberman
*Attorney, Agent, or Firm*—Ronald G. Brookens

[57] ABSTRACT

Process for preparing high solids content organic liquid dispersions of individual particles of polymeric materials containing a preformed dispersion stabilizer which is the product of the reaction of (A) a poly-12-hydroxy stearic acid and (B) a compound selected from the group consisting of compounds of the formula

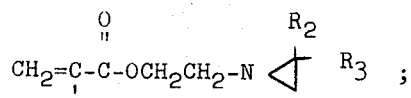

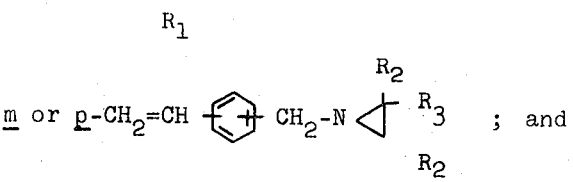

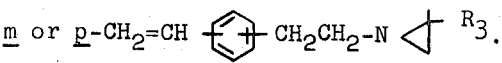

In the above formulas
$R_1$ is hydrogen or $CH_3$,
$R_2$ is hydrogen or lower alkyl, and
$R_3$ is hydrogen or lower alkyl.

3 Claims, No Drawings

PROCESS FOR PREPARING HIGH SOLIDS CONTENT POLYMER LACQUER DISPERSIONS

BACKGROUND

It has been proposed, e.g., in British Pat. No. 1,123,611, to stabilize a dispersion of a polymer in an organic liquid in which it is insoluble by polymerizing monomer to form insoluble polymer in an organic liquid containing a preformed stabilizer composed of (A) a material which is solvated by the liquid, such as poly-12-hydroxy stearic acid, and (B) another material of different polarity which is relatively nonsolvated and associated with the disperse polymer particles, e.g., an epoxy resin. The present invention, is an improvement over such prior art whereby organic liquid dispersions of high polymer solids content are obtained which dispersions are characterized by relatively low viscosities and provide glossy continuous film coatings on a wide variety of substrate materials.

Because of their excellent water barrier properties, the normally crystalline vinylidene chloride resins find extensive use as coatings for a wide variety of substrate materials. When such resins are used in the form of prior known dispersions in organic liquids, i.e., as lacquer dispersions, several coating layers are usually required to obtain a continuous film on the substrate being coated due to the necessarily low polymer solids content of such dispersions, e.g., a maximum obtainable polymer solids content of between about 15 to 30 percent. Similarly, the use of such resins as aqueous dispersions are generally limited to a polymer solids content of less than about 55 percent, and further require coagulation of the polymeric material, isolation of the polymer solids from hydrophilic emulsifiers and surfactants, and drying of the wet polymer. It is particularly desirable therefore, to utilize lacquer dispersions of the normally crystalline vinylidene chloride polymers containing significantly higher amounts of polymer solids, i.e., containing from about 75 to 80 percent or more solids based on dispersion weight and which dispersions are additionally characterized by a combination of unlimited polymer molecular weight while maintaining relatively low viscosities and low heat vaporizations of the diluents used.

SUMMARY OF THE INVENTION

The obtainment of high solids content lacquer dispersions of polymeric materials having such desirable properties is accomplished by a process comprising polymerizing the monomeric constituents of said polymer in said organic liquid in the presence of a preformed dispersion stabilizer which is the product of the reaction of (A) a poly-12-hydroxy stearic acid having a molecular weight up to about 3,000, and (B) a compound selected from the group consisting of compounds having the formula

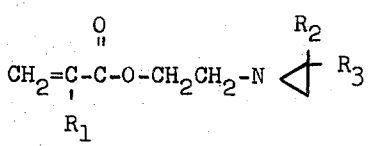

(such compounds are prepared by reaction of aziridinyl alcohols and methyl esters of acrylic or methacrylic acid); or a compound having the formula

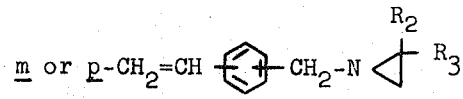

(such compounds are prepared by reaction of ar-vinylbenzyl chloride or bromide and an aziridine in the presence of excess aziridine and a base such as KOH); or a compound having the formula

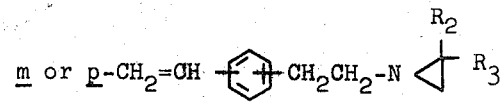

(such compounds are prepared by reaction of an aziridine and divinylbenzene. In the above formulas, $R_1$ is hydrogen or $CH_3$; $R_2$ is hydrogen or lower alkyl, e.g., one to four carbon atoms); and $R_3$ is hydrogen or lower alkyl, e.g., one to four carbon atoms. The mass ratio of (A) to (B) is from about 90 to 80 parts of (A) and from about 10–20 parts of (B).

DESCRIPTION OF THE PREFERRED EMBODIMENTS

Preferred compounds for (B) above are those wherein $R_2$ is hydrogen and $R_3$ is methyl or ethyl. Especially preferred compounds are those wherein $R_2$ and $R_3$ are both hydrogen.

Typical of the monomers which may be polymerized in the presence of the described dispersion stabilizers are monomeric acrylic and methacrylic acids, esters and amides of such acids; vinyl alcohol and derivatives such as chloride, acetate, chloroacetate and stearate; nitriles such as acrylonitrile, styrene and derivatives such as vinyl toluene, α-methylstyrene, t-butylstyrene, ar-chlorostyrene and divinylbenzene and butadiene; and mixtures thereof.

Typical of the vinylidene chloride polymers, which are particularly useful in the present invention, are those normally crystalline materials containing from about 70 to 95 percent by weight of vinylidene chloride with the remainder being composed of one or more monoethylenically unsaturated comonomers exemplary of which are the esters and amides of acrylic acid, methacrylic acid and maleic acid or other copolymerizable vinyl acids. Specific esters are those which contain alcohols of one to eight carbon atoms, such as methyl acrylate, methyl methacrylate, ethyl acrylate, n-butyl methacrylate, octyl acrylate, 2-ethylhexyl acrylate, etc. Specific amides include acrylamide, methacrylamide, t-butylacrylamide and primary alkyl acrylamides such as n,n-dimethylacrylamide and the like. Other monomers which may be copolymerized with vinylidene chloride include acrylonitrile, methacrylonitrile and acrylates or methacrylates of glycols, e.g., hydroxyethyl, hydroxypropyl or hydroxybutyl acrylate or methacrylate. The preferred compositions comprise vinylidene chloride-methyl acrylate or vinylidene chloride-ethyl acrylate copolymers; and vinylidene chloride-vinyl chloride-methyl acrylate or vinylidene chloride-methyl acrylate-acrylonitrile interpolymers.

The polymerization is carried out in liquid hydrocarbons having a boiling point between about 30°C. and 300°C. and, preferably having a boiling point of from about 50°C. to 140°C. as the continuous phase. If the system is used under pressure, e.g., aerosol spraying cans, the boiling point of the hydrocarbon may be between 30°C. and 35°C. One may use a single type of hydrocarbon or mixtures. These hydrocarbons are mostly of aliphatic nature but they may be modified with aromatic hydrocarbons, such as benzene, toluene, xylene, etc. Such mixtures may contain as much as 50 percent aromatic hydrocarbons. After dispersion polymerization is completed, the dispersion may be diluted with active solvents which also function as coalescing agents. Examples are: mixtures of methyl ethyl ketone and toluene, acetone, ethoxyethyl acetate, tetrahydrofuran, etc. Other diluents such as hexane, heptane, octane, nonane, pentane, VM&P naphtha may be used also.

The polymer dispersions may also be modified with other additives such as crystalline waxes to improve moisture barrier properties.

The preparation of the instant dispersion stabilizers is illustrated by the following reaction sequence:

The presence of structure V is advantageous since the secondary amine group functions as a hydrogen chloride scavenger and helps to stabilize the vinylidene chloride polymers.

Structure I is a polymeric substance of average molecular weight 300 to 3,000. The preferred average molecular weight of the polyester is from about 1200 to about 1700.

The dispersion preferably contains about 0.1-3 percent of the dispersion stabilizer (IV and/or V). However, higher amounts may be used. The stabilizer has plasticizing properties and may be used in amounts up to about 50 percent.

The dispersions are made up to about 80 percent total solids or more. The high percent solids material may be used with roller coaters or through dip application. If the high solids dispersion is diluted it may be spray applied. The polymer dispersions, and particu-

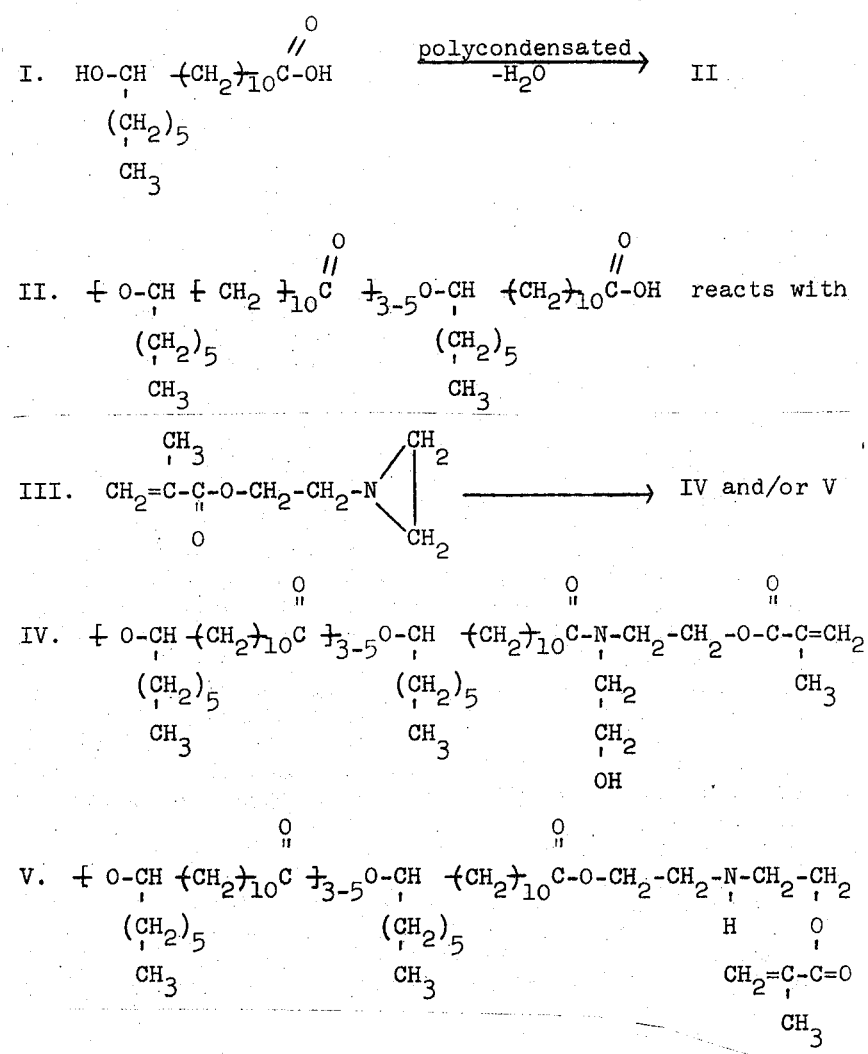

Structure I (12—OH—stearic acid) is oligomerised to structure II. The carboxyl end groups then react with the aziridinyl group of III to form the corresponding ester and/or amide, IV and/or V, which are oligomeric monomers which are soluble in monofunctional hydrocarbon solvents.

If the above reaction is carried out at temperatures below 50°C. the mole ratio of IV to V is about 80:20. At temperatures above about 110°C. the mole ratio of IV to V is about 90:10. Increasing the reaction temperature favors the formation of structure IV.

larly the normally crystalline vinylidene chloride polymer dispersions may thus be applied as coatings on substrates such as textile material, paper, boxboard, leather, wood, metals, ceramic materials, cement, polyvinyl plastics, tiles, asbestos, etc.

The preferred polymer compositions are formulated in such a way that they form a continuous film at room temperature. Such a composition may be a vinylidene chloride-methyl acrylate copolymer at proportions about 80:20. However, if the methyl acrylate is substituted with a hard monomer such as methyl methacrylate or acrylonitrile the polymer composition will not form a continuous form. The dried polymer is discrete and of powdery form. Conventional plasticizers may then be added at such quantities which guarantee film formation at room temperature or elevated temperature. Plasticizers of this kind may be derivatives of citric acid such as acetyl tributyl citrate, phthalates such as dibutyl phthalate, diisooctyl phthalate, sebazates such as dibutylsebazate and dioctylsebazate or other plasticizers which are listed, e.g., in the book by Payne on "Organic Coating Technology," Volume 1, pages 389–391.

EXAMPLES

The invention is best understood by reference to the following illustrative examples:

Example 1 — Preparation of high solids vinylidene chloride polymer dispersion

A. Preparation of stabilizer monomer

A carboxyl terminated poly-12-hydroxy stearic acid (900 g.) having a molecular weight of about 1,600 was reacted with 79 grams of 2-(1-aziridinyl) ethyl methacrylate in the presence of 765 grams isooctane at 45°C. for two days (hereinafter referred to as stabilizer monomer solution (i).

B. High solids dispersion polymerization

A 400 cc citrate bottle was loaded as follows:

Vinylidene chloride (125 g.), 25 grams methyl acrylate, 37 grams isooctane, 6 grams of stabilizer monomer solution (i) at 50 percent solids (described under A above) and 0.45 gram of azobisisobutyronitrile. The bottle was capped and put in a rotating tumbler containing water having a temperature of 65°C. After 12 hours the bottle was removed and cooled. The resulting product was a stable dispersion at 80 percent solids. The average particle size of the dispersion was 0.1937 micron. The product viscosity of the dispersion at 80 percent solids was roughly 140 cps (centipoise).

C. Application as coating for cellophane film

A film of 0.2 mil thickness was cast from the dispersion of B above on cellophane. The wet film was allowed to dry at 50°C. for 12 hours. The resulting film was glossy and clear. A piece of the film on the cellophane was circled out and the moisture barrier property determined according to the TAPPI standard method T 464m–45 (flat barrier).

It was found that the moisture permeation of the film was 0.6 g/100 in.$^2$ per day. This value indicates that the polymer as described under B above is suitable as a coating for clay coated boxboard containers which contain detergents, food or other moisture sensitive materials. Films also were exposed to UV light for 110 hours. It was found that the UV light resistance of the polymers made via the process of this invention were comparable or superior to conventional vinylidene chloride polymer film materials.

Example 2 — Preparation of high solids vinylidene chloride polymer dispersion

A. Preparation of stabilizer monomer

Poly-12-hydroxy stearic acid (1,030 g.) at solids content 90 percent in xylene and acid value between 32–35 is reacted with 82 grams of N-(ar-vinylbenzyl) aziridine in presence of 770 grams isooctane at 125°C. for 3 ½ hours (thereinafter referred to as stabilizer monomer solution (ii)). The N-(ar-vinylbenzyl) aziridine was an isomeric mixture having approximately 60–70 percent of the meta isomer and 40–30 percent of the para isomer.

B. High solids dispersion polymerization

A 400 cc citrate bottle was loaded as follows:

Vinylidene chloride (80.0 grams), 20 grams methyl acrylate, 37 grams VM&P naphtha, 6 grams of stabilizer monomer solution (ii) (described under A above). The bottle was capped and put in a rotating tumbler containing water having a temperature of 65°C. After 12 hours the bottle was removed and cooled. The resulting product was a stable dispersion at about 80 percent solids. The average particle size of the dispersion was 0.185 micron. The product viscosity of the dispersion at 70 percent solids was approximately 250 cps.

Film properties was evaluated under the same fashion and results obtained as described under Example I.

Example 3

A 400 cc citrate bottle was loaded as follows:

Vinylidene chloride (60 g.), 20 grams vinylchloride, 16.5 grams methyl acrylate, 3.5 grams hydroxypropyl acrylate, 25 grams VM&P naphtha, 4 grams of stabilizer monomer solution (i) (described under Example 1) or stabilizer monomer solution (ii) (described under Example 2) and 0.5 grams of azobisisobutyronitrile. The bottle was capped and put in a rotating tumbler containing water having a temperature of 65°C. After 12 hours the bottle was removed and cooled. The resulting product was a stable dispersion at about 78.0 percent solids.

Example 4

A 400 cc citrate bottle was loaded and the ingredients reacted (essentially as per Example 3) using a stabilizer monomer solution prepared (essentially as per Example 1 A) from poly-12-hydroxy stearic acid and 2-(4-vinylphenyl)ethyl aziridine. The resulting product was a stable dispersion at about 75 percent solids.

What is claimed is:

1. A process for preparing a dispersion containing from about 75 to 80 percent by weight of individual particles of a normally crystalline vinylidene chloride polymer in a nonpolar organic liquid hydrocarbon having a boiling point between about 30°C. to 300°C. which process comprises polymerizing the monomeric constituents of said polymer in said organic liquid in the presence of from about 0.1 to 3 percent by polymer weight of a preformed dispersion stabilizer which is the product of the reaction of (A) a poly-12-hydroxy stearic acid having a molecular weight up to about 3,000, and (B) a compound selected from the group consisting of compounds of the formula

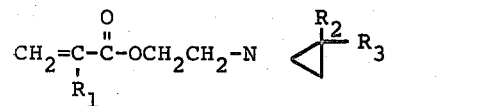

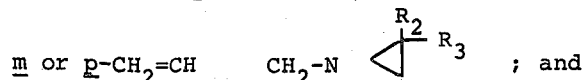

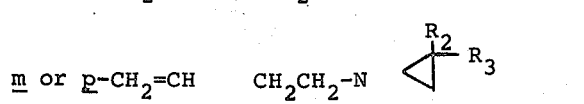

where
$R_1$ is hydrogen or $CH_3$,
$R_2$ is hydrogen or lower alkyl, and
$R_3$ is hydrogen or lower alkyl;
wherein the mass ratio of (A) to (B) is from about 90:10 to about 80:20.

2. The process of claim 1 wherein (A) has a molecular weight of from about 1,200 to 1,700.

3. The process of claim 2, wherein said polymer contains about 80 percent by weight vinylidene chloride and 20 percent by weight methyl acrylate.

* * * * *